US009342965B2

(12) United States Patent
Elgebaly et al.

(10) Patent No.: US 9,342,965 B2
(45) Date of Patent: May 17, 2016

(54) METHODS AND APPARATUS FOR PROVIDING ASSISTANCE SERVICES FOR LARGE CROWDS

(75) Inventors: Hani H. Elgebaly, Cairo (EG); Ashraf H. Badawi, Elk Grove, CA (US); Ahmed S. Ibrahim, Cairo (EG); Mohamed Yousef Soliman, Cairo (EG)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 13/996,661

(22) PCT Filed: Dec. 22, 2011

(86) PCT No.: PCT/US2011/066783
§ 371 (c)(1),
(2), (4) Date: Jun. 21, 2013

(87) PCT Pub. No.: WO2013/095496
PCT Pub. Date: Jun. 27, 2013

(65) Prior Publication Data
US 2014/0203909 A1 Jul. 24, 2014

(51) Int. Cl.
*G08B 5/22* (2006.01)
*G06Q 10/06* (2012.01)
(Continued)

(52) U.S. Cl.
CPC ............. *G08B 5/223* (2013.01); *G06Q 10/06* (2013.01); *H04W 4/023* (2013.01); *H04W 4/08* (2013.01); *H04W 4/206* (2013.01); *H04W 4/001* (2013.01); *H04W 4/008* (2013.01); *H04W 4/22* (2013.01)

(58) Field of Classification Search
CPC ....... G06Q 10/06; H04W 4/08; H04W 4/023; H04W 4/206; H04W 4/22; H04W 4/008; G06K 17/00

USPC ............................. 340/8.1, 10.1, 573.1, 539.1
See application file for complete search history.

(56) References Cited

U.S. PATENT DOCUMENTS 6,424,264 B1 * 7/2002 Giraldin ................. G06K 17/00
340/539.1
2006/0058018 A1 3/2006 Toulis et al.
(Continued)

FOREIGN PATENT DOCUMENTS

CN 103999117 A 8/2014
EP 2 795 566 A1 10/2014
(Continued)

OTHER PUBLICATIONS

International Preliminary Report on Patentability and Written Opinion received for PCT Patent Application No. PCT/US2011/066783, mailed on Jul. 3, 2014, 7 pages.
(Continued)

Primary Examiner — Nabil Syed
(74) Attorney, Agent, or Firm — Barre Law Firm, PLLC

(57) ABSTRACT

In one example embodiment, a mobile computing device provides assistance services for visitors at events which involve large crowds and long distances. The mobile computing device may be used to read a unique identifier for a visitor from an identification token for the visitor. The mobile computing device may then send visitor location data for the current location of the visitor to a remote command center. The mobile computing device may then receive leader location data from the remote command center. The leader location data may identify a last known location for a leader of a group of visitors that includes the visitor. After receiving the leader location data, the mobile computing device may compute directions from the current location of the visitor to the last known location of the leader, and the mobile computing device may display those directions on a map. Other embodiments are described and claimed.

20 Claims, 8 Drawing Sheets

(51) Int. Cl.
*H04W 4/08* (2009.01)
*H04W 4/02* (2009.01)
*H04W 4/20* (2009.01)
*H04W 4/00* (2009.01)
*H04W 4/22* (2009.01)

(56) References Cited

U.S. PATENT DOCUMENTS

| | | | |
|---|---|---|---|
| 2006/0132300 A1* | 6/2006 | Howe, Jr. | G07C 9/00111 340/539.13 |
| 2009/0276154 A1 | 11/2009 | Subramanian et al. | |
| 2010/0030465 A1 | 2/2010 | Solkesz et al. | |
| 2010/0190468 A1 | 7/2010 | Scott et al. | |
| 2010/0323722 A1 | 12/2010 | Hatami et al. | |
| 2011/0080262 A1* | 4/2011 | Richardson | G08B 21/0275 340/8.1 |

FOREIGN PATENT DOCUMENTS

| | | |
|---|---|---|
| KR | 10-2009-0055680 A | 6/2009 |
| WO | 2013095496 A1 | 6/2013 |

OTHER PUBLICATIONS

Elgebaly, Hani, "Wireless Innovation in Emerging Markets", the Wireless World Research Forum Meeting 27, Düsseldorf, Germany, Oct. 19, 2011, pp. 1 and 14-15.

International Search Report and Written Opinion received for International Application No. PCT/US2011/066783, mailed Sep. 5, 2012, 10 pages.

Extended European Search Report received for European Patent Application No. 11878064.2, mailed on Jul. 13, 2015, 7 pages.

Office Action received for Taiwan Patent Application No. 101149060, mailed on Jan. 21, 2016, 11 pages of Office Action including 1 page of Search report.

* cited by examiner

METHODS AND APPARATUS FOR PROVIDING ASSISTANCE SERVICES FOR LARGE CROWDS

TECHNICAL FIELD

The present disclosure relates in general to data processing. More particularly, the present disclosure relates to methods and apparatus for providing automated assistance services for events that involve long distances and large crowds of people.

BACKGROUND

Many different types of events involve large crowds and long distances. For instance, in a typical year, Mecca in Saudi Arabia receives over one million visitors from all over the world, when those visitors come to visit the Kaaba during the Islamic pilgrimage known as Hajj. For another example, in 2010, Haiti was hit by a catastrophic earthquake measuring 7.0 on the moment magnitude scale. The earthquake left hundreds of thousands of people homeless. Disaster response teams in Haiti were tasked with helping homeless victims of the earthquake in Port-au-Prince and many other towns and settlements to find basic necessities like food and shelter. Other examples of events involving large crowds and long distances include other types of religious gatherings, sporting events, political events, famine relief efforts, and many other types of events or activities.

Crowd assistance service is one of the main challenges faced by authorities overseeing these kinds of events. For example, during the period of Hajj, hundreds of thousands of pilgrims share the same resources, follow the same routes, and occupy the same locations. One of the big challenges for the authorities is how to control the crowd and ensure a smooth and safe flow without congestion, as congestion may lead to life threatening situations, including stampedes. Traditional manual crowd management methods consume a lot of effort and in many cases result in delays in delivered services. Therefore, an urgent need exists for innovative ideas and solutions using technology to help provide assistance services for large crowds.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION OF ONE OR MORE EMBODIMENTS

As indicated above, assistance services may be useful for helping people in a wide variety of situations. However, for purposes of this disclosure, the term "visitor" is used in general to refer to an individual who receives or may receive) assistance from a crowd assistant service system. Thus, the term "visitor" includes, without limitation, pilgrims, tourists, victims of natural disasters, and other classes of people involved with a particular event or group of events at a particular location or group of locations.

One embodiment involves a distributed system of devices for providing assistance services for crowded events. The distributed system of devices may be referred to as a crowd assistance system. A visitor may utilize the crowd assistance system to obtain useful information such as the route to his or her current residence, the route to his or her group leader, or the route to the nearest hospital.

Figure 1:
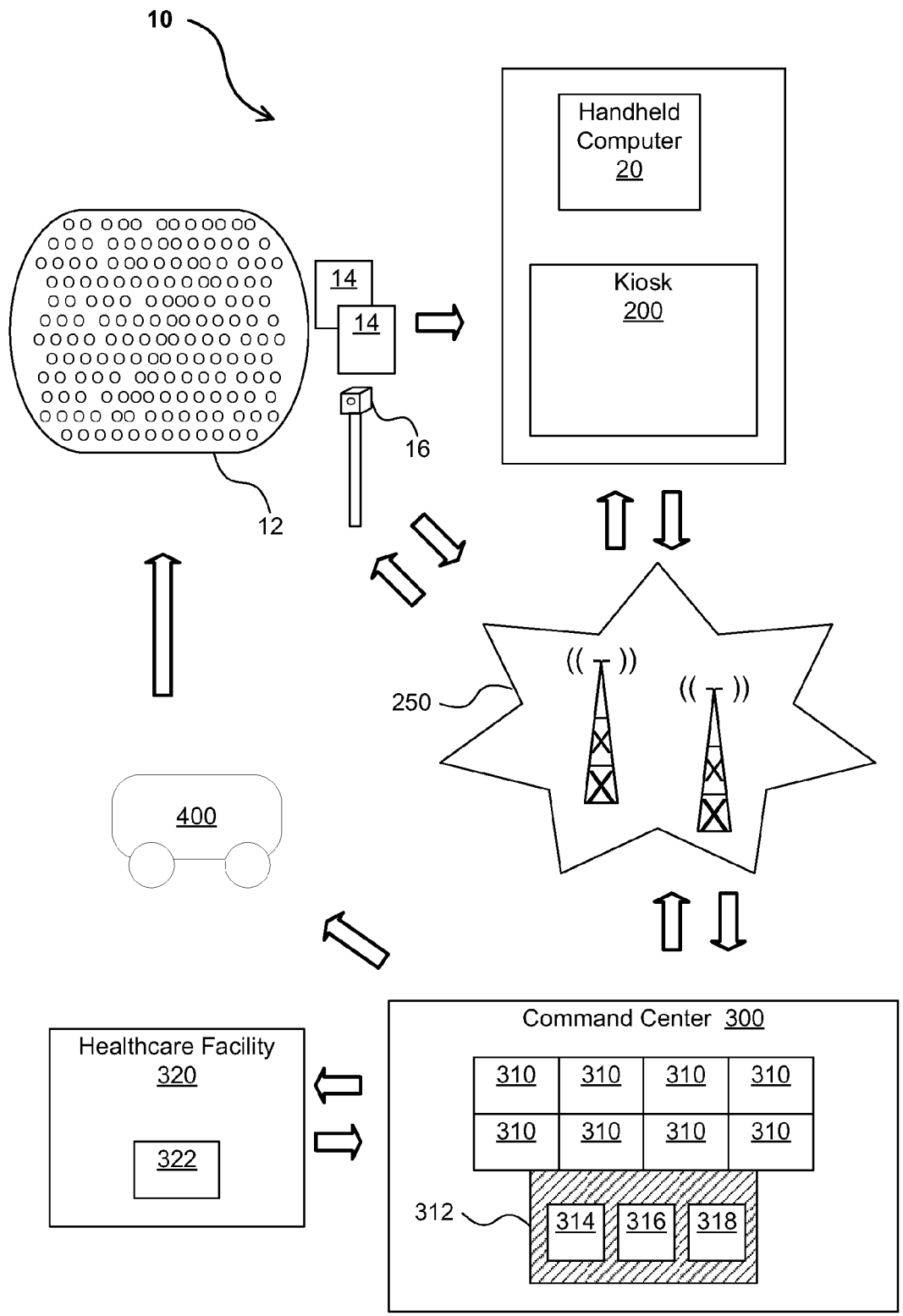
FIG. 1 is a block diagram of a distributed system of computing devices for providing assistance services for crowded events, according to one example embodiment.

FIG. 1 is a block diagram of an example embodiment of a crowd assistance system 10. In the embodiment of FIG. 1, the event involves a large crowd of people or "visitors" 12, and at least some of those visitors have individually assigned identification (ID) tokens 14. An ID token may be provided to the visitor as part of an ID card, for instance, or in any other suitable manner.

In addition security guards and/or other types of assistants for the event may be stationed at various different locations to help the visitors, and each of these assistants may be equipped with a mobile computing device such as a handheld computer 20. In one example scenario, hundreds or even thousands of assistants may be provided with mobile computing devices and deployed to strategic locations to help hundreds of thousands of visitors.

Figure 2:
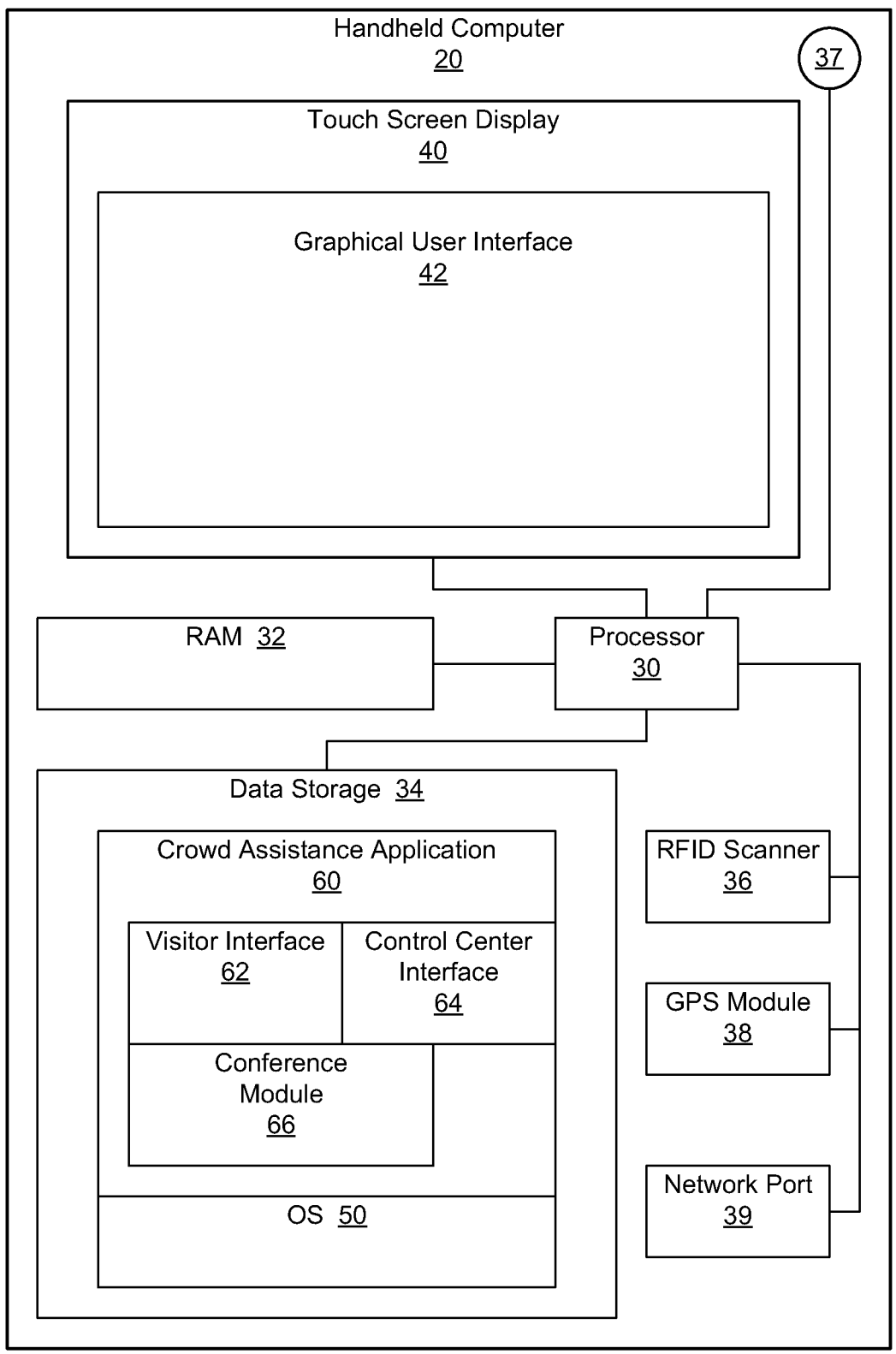
FIG. 2 is a block diagram of a mobile computing device configured for providing assistance services for crowded events, according to one example embodiment.

FIG. 2 is a block diagram of a data processing system such as a handheld computer 20 configured for providing assistance services for crowded events, according to at least one example embodiment. In the embodiment of FIG. 2, the handheld computer includes one or more processors 30 in direct or indirect communication with other components such as random access memory (RAM) 32, one or more non-volatile data storage devices 34, and various input/output (I/O) components such as a radio-frequency identification (RFID) scanner 36 for reading RFID chips, a camera 37, a Global Positioning System (GPS) module 38, and a network adapter or port 39. Alternative embodiments may include sensors or I/O ports for reading tokens from devices other than RFID chips. For example tags and readers may use Bluetooth, near field communication (NFC), or other technologies for close proximity communication. In one embodiment, the network adapter is configured to support wide area network (WAN) communications using one or more of the following protocols or standards: third generation (3G) mobile telecommunications (e.g., High-Speed Downlink Packet Access (HSDPA), High-Speed Uplink Packet Access (HSUPA), Evolved High Speed Packet Access (HSPA+), and code division multiple access (CDMA) standards such CDMA2000); fourth generation (4G) cellular wireless standards (e.g., Worldwide Interoperability for Microwave Access (WiMAX) and Third Generation Partnership Project (3GPP) Long Term Evolution (LTE)); and other WAN and/or local area network (LAN) technologies to enable the mobile computing device to communicate instantly from the field of the incident.

The processor is also coupled, directly or indirectly, to a touch screen display 40. In one embodiment, to provide for good usability outdoors in daylight, the screen may use advanced technologies such as e-ink or other kinds of electronic paper that reflect and absorb light like ordinary paper and ink. Other embodiments may use a combination between e-ink and liquid crystal display (LCD) technologies (possibly with multiple displays using different technologies), or other display technologies that allow visibility in daylight without compromising battery life. The mobile computing device may use power efficient components, to minimize power consumption and maximize battery life. For instance, the battery life of the device may exceed twelve hours. In one embodiment, the mobile computing device may be a ruggedized tablet with backlight ability, finger print authentication, dust resistance, remote updates, and remote diagnostics over the network (e.g., using Intel Active Management Technology (AMT)).

A crowd assistance application 60 may be stored in the data storage device of the mobile computing device. The crowd assistance application may include various different component or modules, such as a visitor interface 62, a control center interface 64, and a conference module 66. When the crowd assistance application is executed by the processor, the visitor interface may cause a graphical user interface (GUI) 42 to be presented on the display. The visitor interface may use the GUI to present information for assisting visitors, and to present different options that may be selected to request different types of information and/or services from a remote command center. The GUI may support Arabic and/or other languages. The control center interface may include control logic for communicating with the remote command center. The conference module may include control logic enabling the mobile computing device to conduct videoconferences or other communication sessions with healthcare providers. The visitor interface, the control center interface, and the conference module may work together to enable the mobile computing device to facilitate services including, without limitation, (a) dispatching emergency services including ambulances and health care service, police service, and fire brigades; (b) finding the optimum and shortest route to any place of interest, along with additional information about better routes and transportation means to certain locations; (c) retrieving live video for important locations, to assess level of crowdedness in particular areas and conduct specific remedies, with regard to the travel needs of a particular visitor.

Referring again to FIG. 1, in addition or alternatively, one or more help stations or kiosks 200 may be deployed at various locations for use by the visitors and/or for use by assistants. A kiosk may include all of the features of the mobile computing devices, some of those features, and/or additional features. For example, a kiosk may include useful instructions to visitors about the rituals and/or general information about crowdedness situation in the vicinity. The kiosks may also automatically detect the language to be used for the directions, based on the badge information stored on the RFID card. The kiosk may also give the user the option to change the language, which may be useful if one person is getting directions for another person. For instance, if a security guard is helping someone who speaks Urdu, the security guard can ask for the directions in a language known by the security guard, then switch back to Urdu to show the person asking for the assistance.

When a visitor asks for the help of an assistant with a mobile computing device, the visitor may present his or her ID card. The assistant may then use the mobile computing device to read a unique visitor ID from the token in the card. The mobile computing device may also use the GPS module to determine the current location of the mobile computing device (and thus the visitor). In other embodiments, other techniques may be used to determine the location of the visitor, such as location fusion formulas. For instance, in outdoor situations, devices may use triangulation with General Packet Radio Service (GPRS), cellular, WiMAX, and/or other wireless networking technologies. For indoor situations, devices may use technologies such as Wi-Fi, RFID tags, relative indoor coordinates, indoor maps, etc. In other embodiments, a device may be preprogrammed with an assigned location.

The mobile computing device may then send the visitor ID, the location of the mobile computing device, and a service request to a remote command center 300. Communications between the remote command center, the mobile computing device, and the kiosks may use a wired and/or wireless network 250. In one embodiment, the network uses the WiMAX protocol to provide an efficient and reliable wireless broadband communication infrastructure. The network may use various techniques to overcome the challenges associated with supporting thousands of users in a small area. For instance, the network may use a mulituser multiple-input multiple-output (MU-MIMO) technique that allows multiple users to be simultaneously scheduled over the same time-frequency resources. In the MU-MIMO scheme, each user utilizes a pre-coding vector that is orthogonal to the other pre-coding vectors belonging to the rest of the users utilizing the same time-frequency resources. Hence, the base station can decouple the streams belonging to different users with no interference. The MU-MIMO technique may also be referred to as space-division multiple access (SDMA). In addition or alternatively, the network may use interference mitigation schemes. In particular, to support large numbers of users, a 4G network is expected to have a small cell radius, which may result in much interference between the neighboring cells. The interference may cause throughput degradation to the most of the users. However, this interference may be mitigated using multi-base station (Multi-BS) MIMO coordination and/or fractional frequency reuse (FFR). In the Multi-BS MIMO scheme, the neighboring base stations coordinate together to reduce the interference on the cell-edge users. In the FFR, the cell-edge users use frequency reuse factor (or pattern) of three, while the cell-center users utilize frequency reuse factor (pattern of) one. Hence, the FFR can reduce the interference impact and increase the total spectral efficiency. Furthermore, the operator of the crowd assistance system may, if desired, configure the transport network to give a higher quality of service (QoS) to certain types of requests. For instance, the QoS parameters used for communications between a mobile device and the command center workstation may be dynamically set by the mobile device and/or the command center workstation, based on the nature of the call, with life threatening and life critical streams getting a higher priority than less urgent medical assistance requests and requests for direction.

The remote command center may then use the visitor ID to lookup all of the needed information in a global database built for that purpose. The remote command center may then send the required information to the mobile computing device. The mobile computing device may then present the information from the remote command center to the visitor in a convenient, easy-to-understand form (e.g., using a map for directions to specific locations).

In particular, the operations of the remote command center may be performed by one or more workstations 312 or other data processing systems located at the remote command center or accessible from the remote command center. For instance, the command center workstation may include at least one visitor database 314, and the command center workstation may dynamically update the visitor database in response to receiving data for visitors from the mobile computing device. The command center workstation may also include a Geographic Information System (GIS) 316, and the command center workstation may update the GIS based on the data from the mobile computing device. The GIS may include data describing the roads, buildings, and other geographic features of potential interest, as well as location information for various camps of visitors. The command center workstation may also update the GIS with data describing crowd distribution and crowd densities for different areas. The command center workstation may also update the GIS with identity and location data for individual visitors and/or for groups of visitors.

The mobile computing device may also be used to request medical records for the visitor, medical advice, or emergency transportation. For instance, the mobile computing device may retrieve the medical records from a medical database 315 at the command center workstation. The mobile computing device may also be used to establish a videoconference with a healthcare provider, for example via communication through the command center workstation to a video conferencing system 322 or other data processing system in a hospital, in a doctor's office, or in any other suitable facility 320 containing one or more doctors or other healthcare consultants. The mobile computing device may also be used to send an ambulance request to the command center workstation, and in response the command center workstation may cause an ambulance 400 to be dispatched to the location of the visitor.

To obtain an identification token 14, a person may register in advance with the state department of that person's home country, the state department of the host country, or with some other authority, for instance. To register, the visitor (or potential visitor) may supply information such as name, home address, mobile phone number, email address, a photograph of the visitor, a group ID for the group or groups with which the visitor plans to travel on each day of the visit, contact information for another person to be contacted in case of emergency, itinerary information, etc. The itinerary information may include residence information indicating where the visitor plans to reside each day of the visit and destination information indicating which locations the visitor plans to visit on each day of the visit. In addition, some visitors may be designated as group leaders.

Also, one or more cameras 16 may be deployed at various locations, with video feeds going from the cameras to the command center workstation via the network 250. The command center workstation may use video analytics hardware and/or software to compute or estimate how many people are in each different location. The mobile computing devices may also have access to these video feeds. In addition, the mobile computing devices and the command center workstation may include video analytics hardware and software to quickly capture camera information and quickly process this information to produce important data about crowd statistics and recommendations for load balancing. The command center workstation may include an array of monitors 310, which operators may use to view video feeds from the cameras 16, video feeds from the mobile computing devices, and other types of information collected from the field or generated at the command center workstation, such as the data about crowd statistics derived from video analytics, call statistics for the calls from mobile devices serviced by the command center workstation, etc.

Figure 3A:
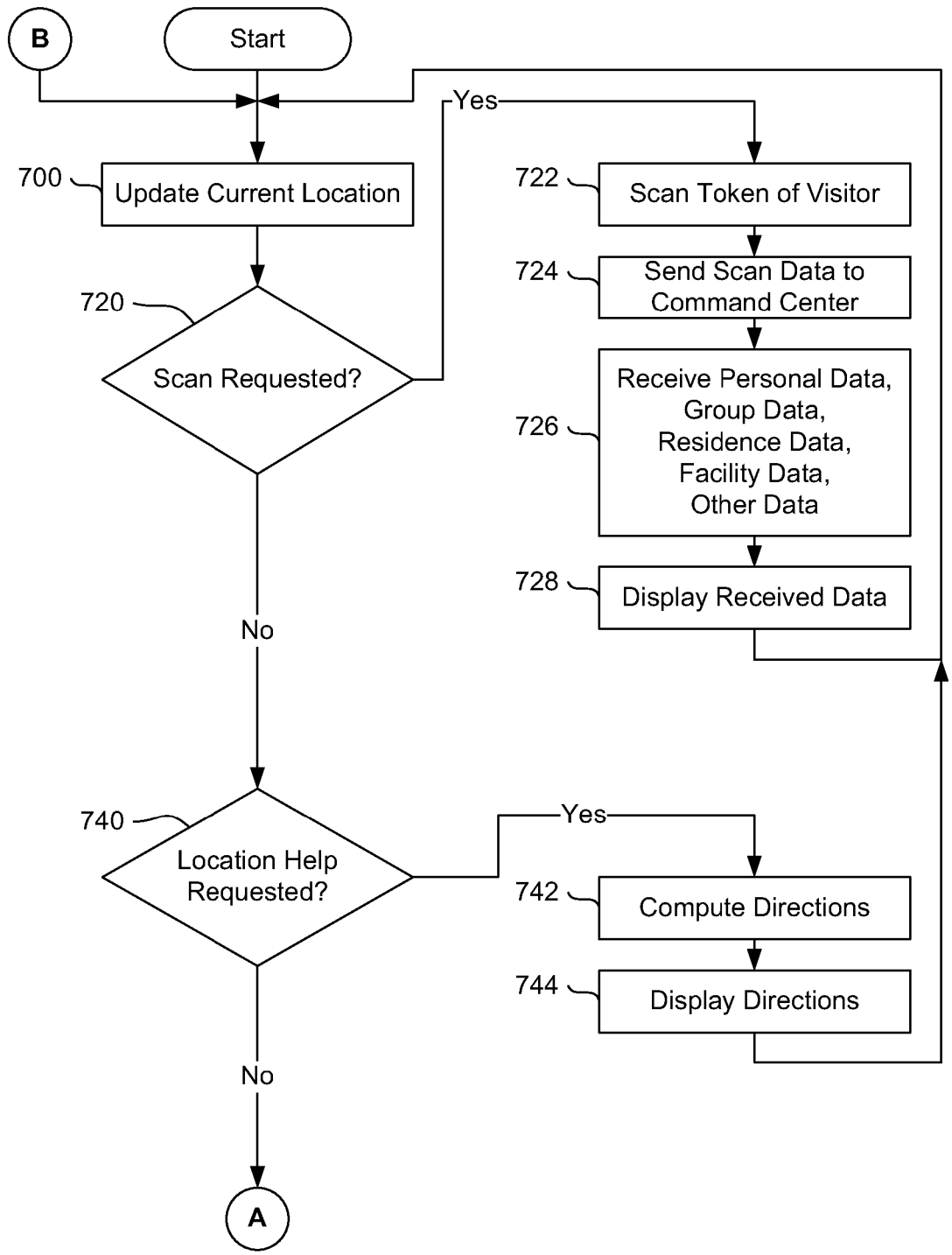
FIGS. 3A and 3B present a flowchart of an example embodiment of a process for using a mobile computing device to provide assistance services for crowded events.
Figure 3B:
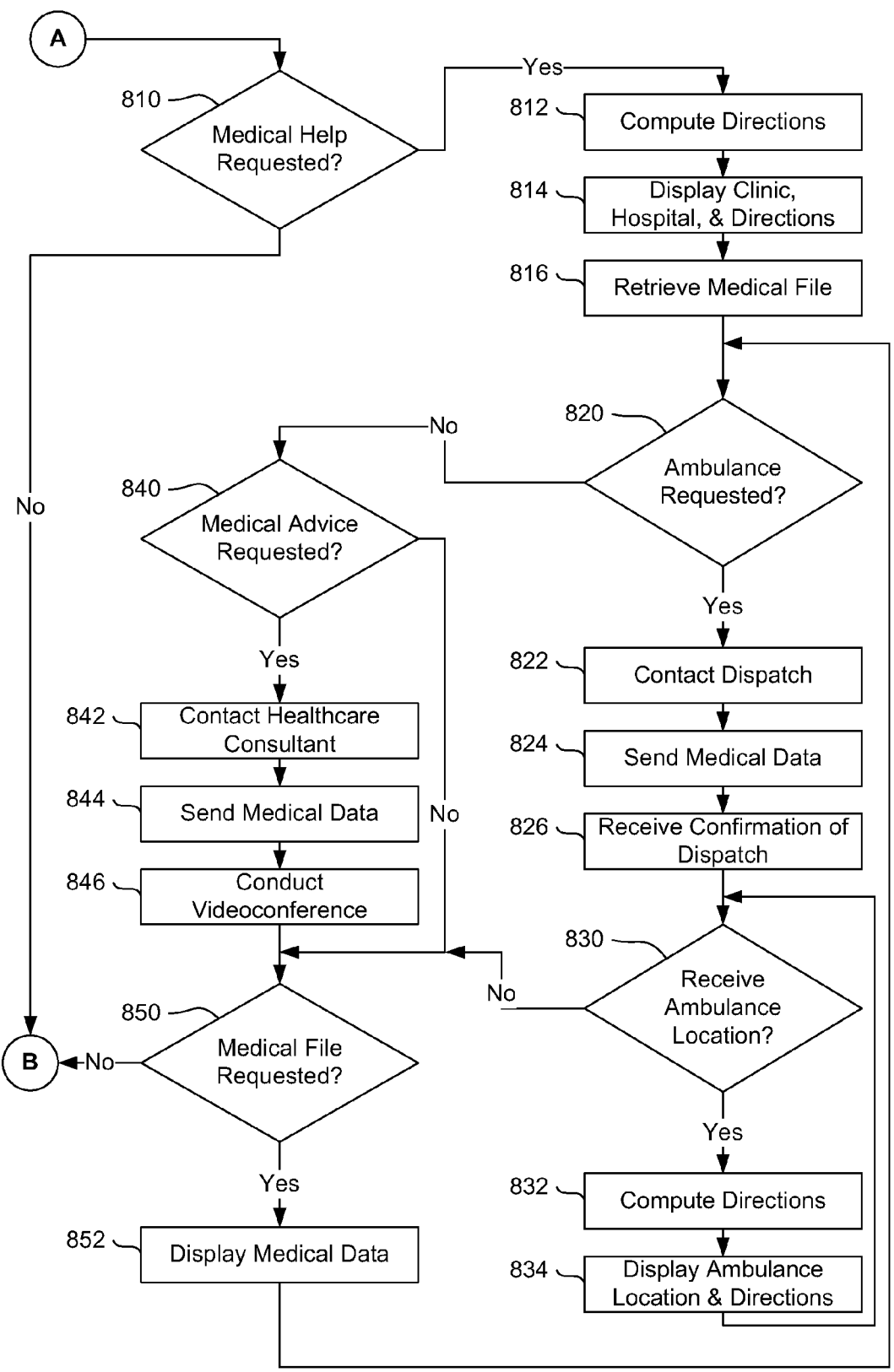

FIGS. 3A and 3B present a flowchart of an example embodiment of a process for using a mobile computing device to provide assistance services for crowded events. The process may start with the crowd assistance application in the mobile computing device using the GPS module to determine the current location of the mobile computing device, as shown at block 700. The crowd assistance application may then determine whether a new scan has been requested, as shown at block 720.

Figure 4A:
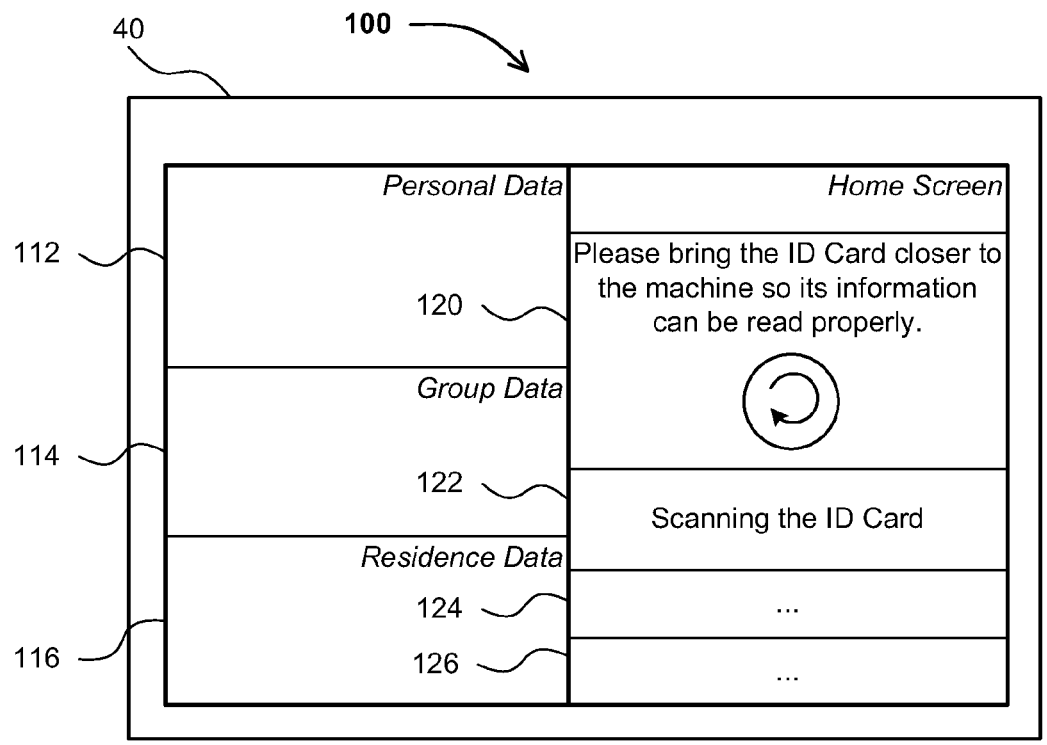
FIGS. 4A through 4F provide schematic diagrams depicting graphical user interface configurations for providing assistance services for crowded events, according to one example embodiment.
Figure 4B:
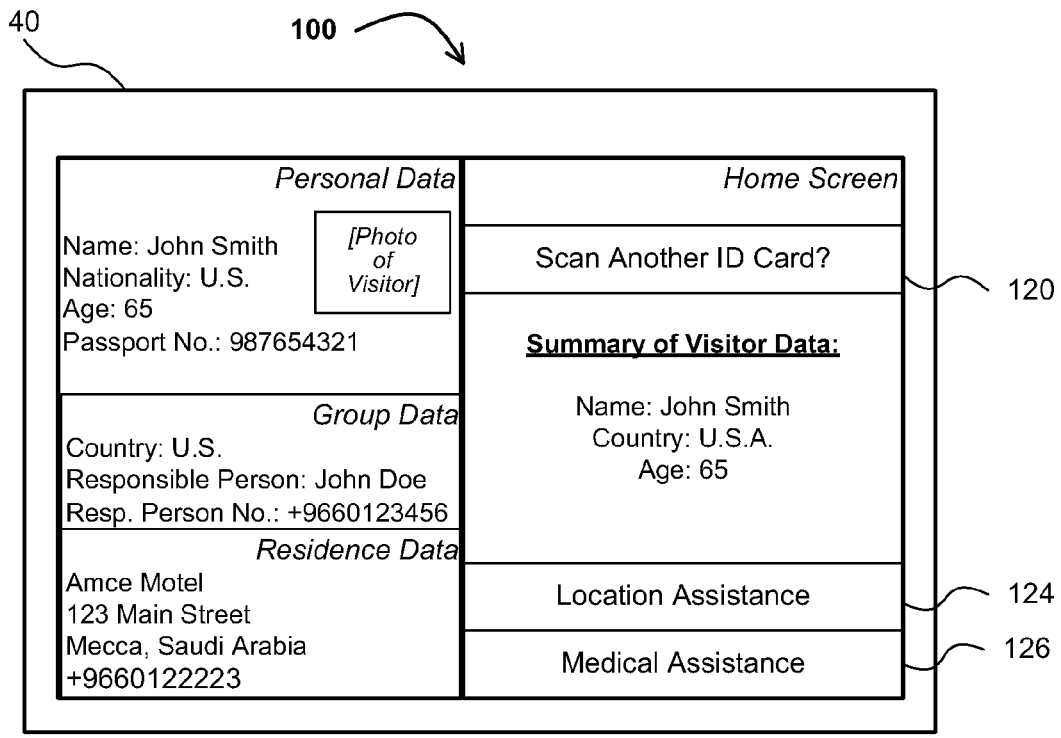

FIGS. 4A through 4F provide schematic diagrams depicting graphical user interface configurations for providing assistance services for crowded events, according to at least one example embodiment. In particular, FIGS. 4A and 4B depict an example embodiment of a home screen 100 for the crowd assistance application. The home screen may include various subdivisions for presenting different types of information, such as a personal data box 112, group data box 114, a residence data box 116, and a status box 122. The home screen may also include various buttons and/or other control objects for receiving user input, such as a scan button 120 and assistance option buttons 124 and 126. When a visitor contacts an assistant for help, the assistant may press the scan button to cause the mobile computing device to read the or ID from the visitor's ID token.

Referring again to FIG. 3A, as indicated at blocks 722 and 724, when the assistant invokes the scan function, the crowd assistance application may respond by reading the visitor ID from the visitor's ID token and then sending data concerning the visitor to the remote command center. That data may include the unique visitor ID, a unique identifier for the mobile computing device, and the present location of the mobile computing device.

Figure 5:
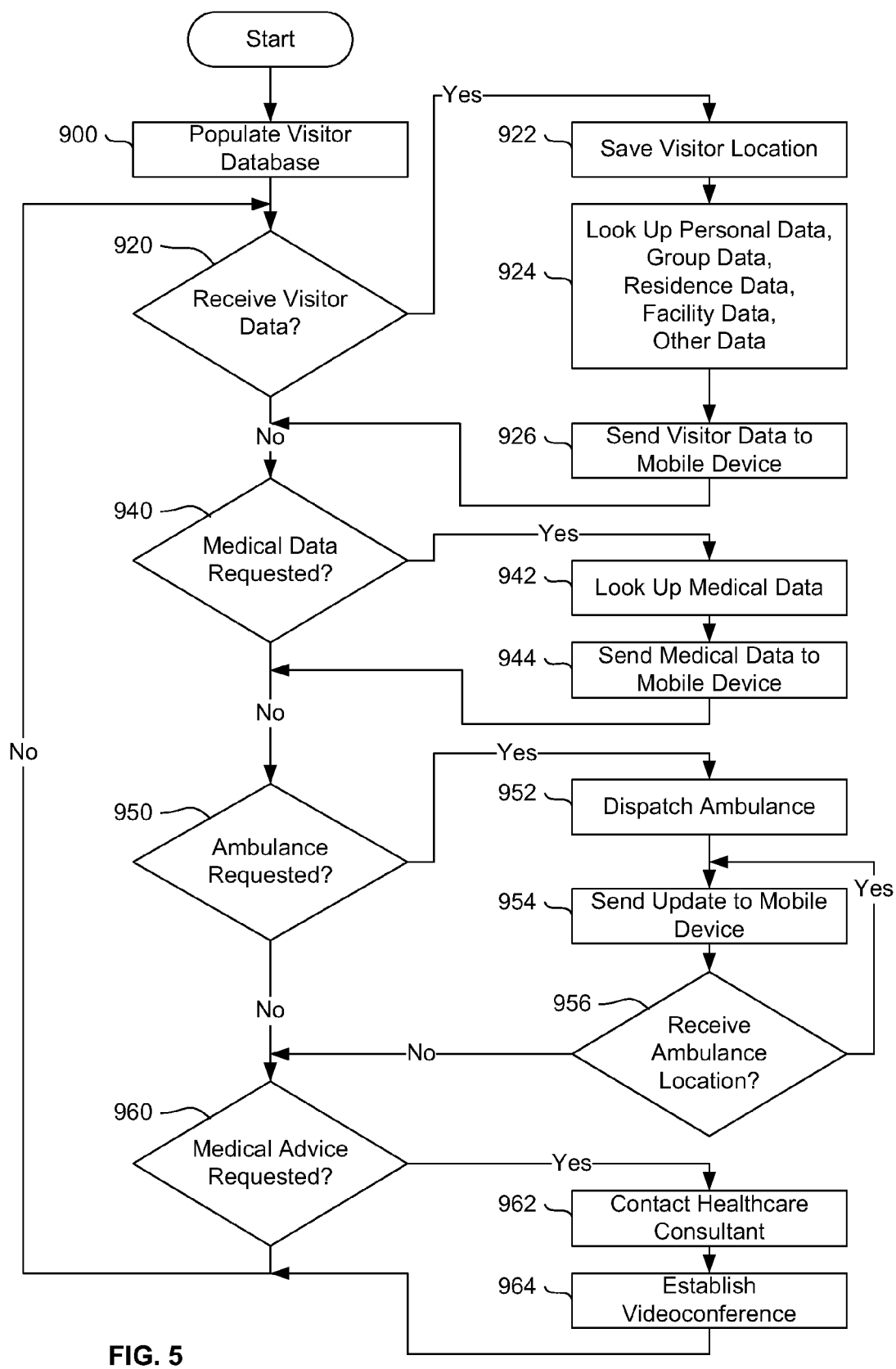
FIG. 5 presents a flowchart of an example embodiment of a process for using a remote command center to provide assistance services for crowded events.

FIG. 5 presents a flowchart of an example embodiment of a process like that of FIGS. 3A and 3B, but more from the perspective of the remote command center. That process may start with population of the various databases of the command center workstation (e.g., the visitor database, the GIS, and the medical database), as shown at block 900. Subsequently, as indicated at block 920, the command center workstation may determine whether it has received visitor data from a mobile computing device. If so, as shown at block 922, the command center workstation may save the current location of the visitor in the visitor database, along with the visitor ID, the identifier for the device that was used to scan the visitor's token, and the current time.

The command center workstation may also use the visitor ID to retrieve data for the visitor and for the visitor's group from the visitor database, as shown at block 924. The retrieved information may be referred to in general as visitor data, and it may include, without limitation:
personal data for the visitor (which may include, without limitation, the name of the visitor, the age of the visitor, the sex of the visitor, the nationality of the visitor, the passport number of the visitor, and a photo of the visitor);
group data for the group with which the visitor is supposed to be traveling (which may include, without limitation, a name or other identifier for the group, a country of origin for the group, the name, phone number, email address, and/or other contact information for the person (or persons) designated as leader or leaders) of the group, and location data specifying the last known location(s) of the designated leader(s) of the group);
residence data identifying one or more residences for the visitor during the event (e.g., identifying the residence associated with the visitor for the current date); and
facility data identifying various buildings or other points of potential interest for the visitor (which may include, without limitation, names, addresses, geographical coordinates, phone numbers, email addresses, and other contact information for facilities such (a) as the urgent medical care clinic closest to the visitor, (b) the hospital closest to the visitor, (c) one or more other points of interest near the visitor).

The command center workstation may also use the GIS and/or the visitor database to determine which healthcare clinic, which hospital, and which other points of interest are near the visitor, based on the current location of the visitor, the current date and/or time, and preregistered itinerary information from the visitor database, for instance. The itinerary may be based on data supplied by the visitor, and it may identify particular locations the visitor is supposed to be visiting at different times.

The command center workstation may also determine a target location for the visitor. For example, the command center workstation may be configured to use the last known location of the visitor's group leader as the default target location. The command center workstation may then compute directions from the location of the visitor to the target location. Alternatively or in addition, directions may be computed by the mobile computing device, as indicated below. Also, if the assistant suspects that the visitor needs medical assistance (e.g., if the visitor is unconscious or injured), the assistant can press the corresponding medical assistance button and accordingly the command center workstation will automatically send the location of the closest hospital or clinic. In particular, the command center workstation may use an optimization algorithm to assign facilities or service points for medical assistance calls. For instance, the call center may direct an ambulance to the best, available hospital based on both (a) a utilization index indicating how busy each hospital is and (b) an estimated time of arrival, based on current traffic conditions (which may be monitored by cameras). The command center workstation may also monitor queuing characteristics (e.g., wait times) at the medical centers, and may use that data when computing an optimum facility for medical assistance.

As shown at block 926, after retrieving information for the visitor and computing directions for potential use by the visitor, the command center workstation may then send some or all of the resulting data to the mobile computing device. For purposes of this disclosure, the data that the command center workstation sends to the mobile computing device may be referred to, in general, as command center data for the visitor, or simply as command center data. In addition, the command center workstation may send a message to the group leader to notify the group leader about the location of the visitor.

Figure 4C:
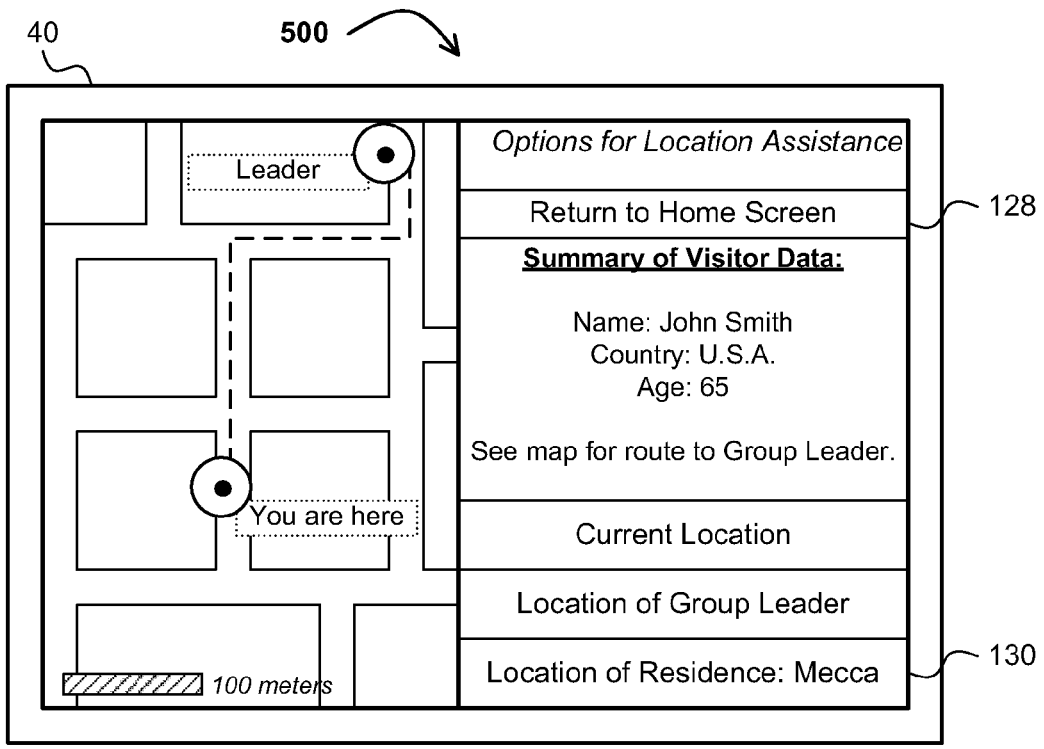
Figure 4D:
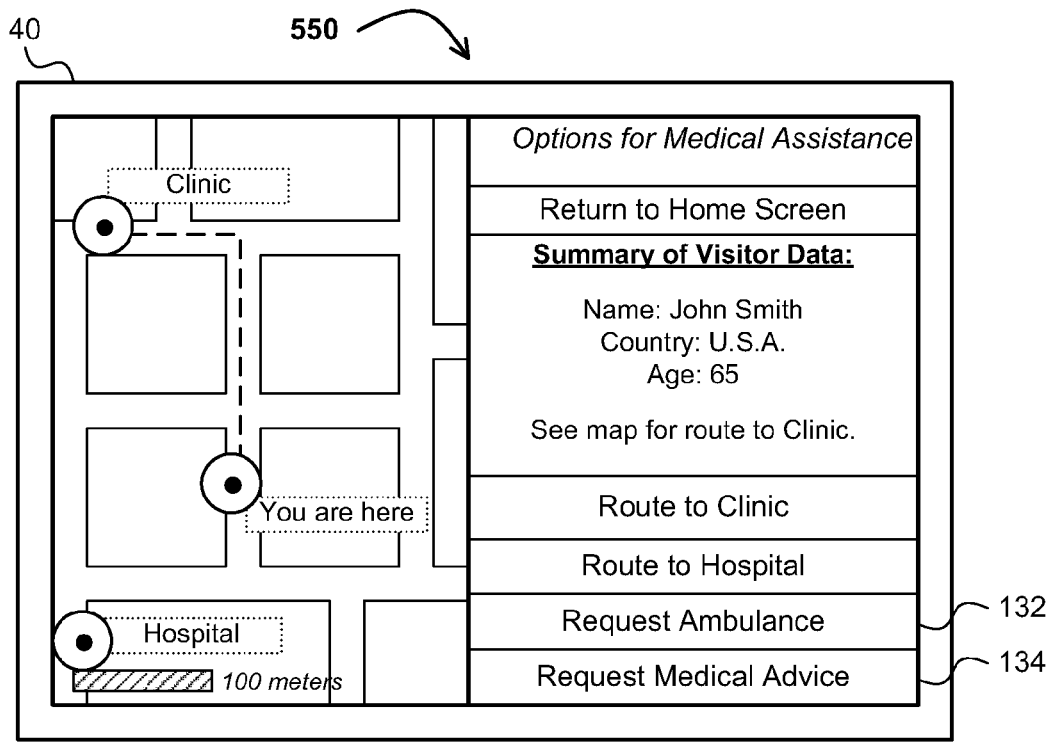

Block 726 of FIG. 3A shows the crowd assistance application receiving that command center data from the command center workstation. As depicted at block 728 and in FIG. 4B, the crowd assistance application may then display at least some of the command center data on the home screen. In addition, the crowd assistance application may activate selectable interface objects such as buttons 120, 124, and 126. For example, scan button 120 may be used to initiate the scanning of another visitor's ID token, option button 124 may be used to bring up a screen 500 adapted for displaying locations (a "location screen"), and option button 126 may be used to bring up a screen 550 adapted for providing medical assistance (a "medical assistance screen") as shown in FIGS. 4C and 4D for instance).

For example, as shown at blocks 740 and 742, in response to selection of the location button on the home screen, the crowd assistance application may compute directions from the current location of the visitor to a default destination, such as the last known location of the visitor's group leader. Then, as shown at block 744 and by the dashed line in the map in FIG. 4C, the crowd assistance application may display, in location screen 500, a map that shows the r's current location, the last known location of the designated leader, and graphical directions connecting those two locations. The assistant may then explain the map to the visitor, or simply show the map to the visitor, if the visitor and the assistant do not speak the same language.

In addition, the location screen may include a button 128 to request a return to the home screen, and one or more buttons to request the mapping of directions to other destinations, such as button 130 for requesting directions to the current residence of the visitor. Other buttons may be provided for requesting directions to other points of interest, possibly based on the visitor's itinerary.

However, if location help has not been requested, the process may pass through page connector A to FIG. 3B, and crowd assistance application may then determine, as indicated at block 810, whether the assistant has selected an option (e.g., medical assistance button 126 in FIG. 4B) for requesting medical assistance. If medical assistance has been requested, the crowd assistance application may automatically compute directions to the nearest urgent care clinic, as shown at block 812. As indicated at block 814, crowd assistance application may then display those directions on medical assistance screen 550, as shown in FIG. 4D. The crowd assistance application may also automatically display the location of the nearest hospital on that map. In addition, as indicated at block 816, the crowd assistance application may automatically retrieve medical data for the visitor from the command center workstation. Accordingly, as depicted at blocks 940, 942, and 944 of FIG. 5, command center workstation may lookup the requested medical records, based on the visitor's ID, and send those records to the mobile computing device.

Referring again to FIG. 550, the medical assistance screen may also include options for requesting directions to the clinic or the hospital, with crowd assistance application responding by computing the requested directions and updating the display to show those directions, as necessary. The medical assistance screen may also include an ambulance button 132 for requesting that an ambulance be dispatched to the current location of the visitor, and a medical advice button 134 for requesting advice from a doctor or other health care consultant.

Figure 4E:
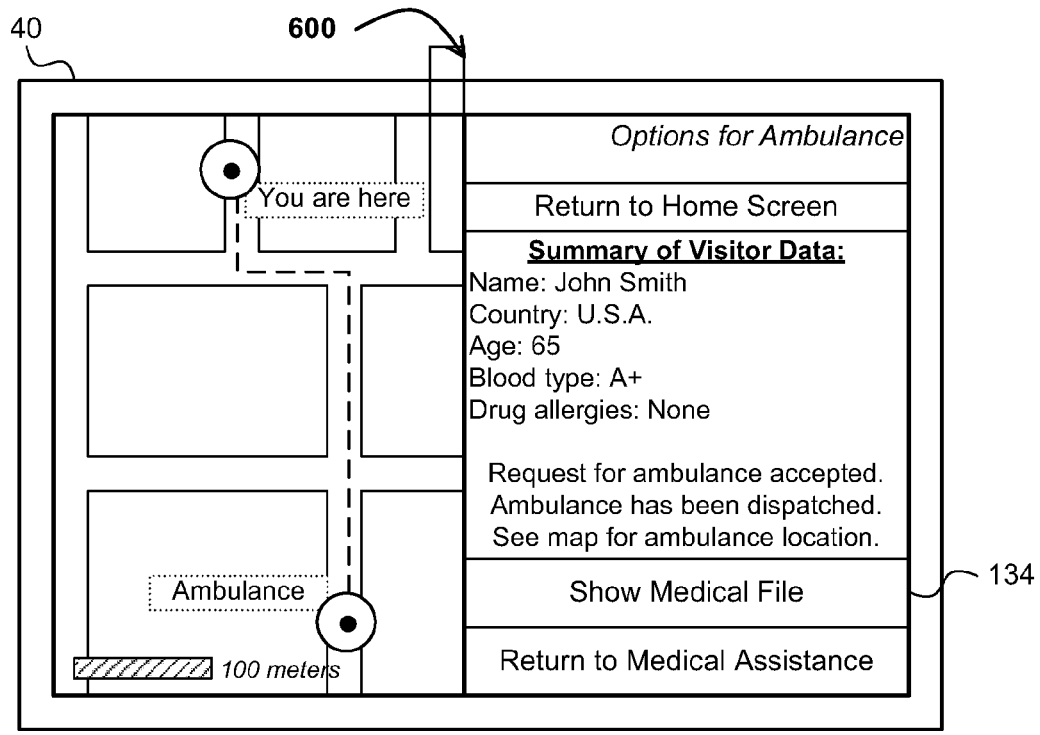

As shown at blocks 820 and 822 of FIG. 3B, when the assistant has requested an ambulance, the crowd assistance application may respond by automatically contacting an ambulance dispatcher to request an ambulance. The crowd assistance application may provide the dispatcher with the current location of the visitor. As shown at block 824, the crowd assistance application may also forward some or all of the medical records for the visitor to the dispatcher, to be forwarded to the ambulance for use by the paramedics. As shown at block 826, once the ambulance has been dispatched, the crowd assistance application may receive confirmation from the dispatcher, and may display confirmation in an ambulance screen 600, as shown in FIG. 4E. Furthermore, as shown at block 830, the crowd assistance application may receive updates on the location of the ambulance, and in response, may automatically calculate directions from the ambulance to the visitor and show those directions, along with the last known location of the ambulance, on the map, as indicated at blocks 832 and 834 and illustrated in FIG. 4E. The crowd assistance application may also compute and display an estimated time of arrival (ETA) for the ambulance, based on the last known location, and based on information describing how much congestion or traffic has been detected on the route. As indicated above hardware and software video analytics features in the mobile computing device and/or the command center workstation may be used to compute crowd data for use when computing effective directions to avoid unnecessary delays and other problems.

Referring again to block 820, if the assistant has not requested an ambulance, the crowd assistance application may then determine whether the assistant has requested medical advice (e.g., by selecting button 134 in medical assistance screen 550), as indicated at block 840. If medical advice has been requested, as shown at blocks 842 and 844, the crowd assistance application may then contact a doctor or other healthcare consultant, and may provide that consultant with some or all of the medical records for the visitor. As shown at block 846, the crowd assistance application may then establish a videoconference for real-time interaction with the healthcare consultant. For instance, crowd assistance application may use camera 37, with communications for the conference or consultation going to and from a data processing system that supports videoconferencing at the facility of the healthcare consultant.

In one embodiment, the crowd assistance application communicates with other service providers (e.g., the ambulance dispatcher, the ambulance, and the healthcare consultant) indirectly, via the command center workstation. In other embodiments, the crowd assistance application may not use the command center workstation when communicating with other service providers. For instance, as indicated at block 950 in FIG. 5, the crowd assistance application may send the ambulance request to the command center workstation. In response, as shown at blocks 952, 954, and 956, the command center workstation may automatically contact the ambulance dispatcher to request the ambulance, and may then forward updates on the status of the dispatch request and the current location of the ambulance from the dispatcher or the ambulance to the crowd assistance application. Similarly, as shown at blocks 960, 962, and 964, for real-time medical consultations, the command center workstation may serve as an intermediary to support communications between the mobile computing device and the healthcare consultant. Alternatively, the crowd assistance application may use the command center workstation for help establishing connections to other service providers, and then subsequent communications may use the established channels, without further participation by the command center workstation. Different combinations of these approaches may be used in different embodiments.

Figure 4F:
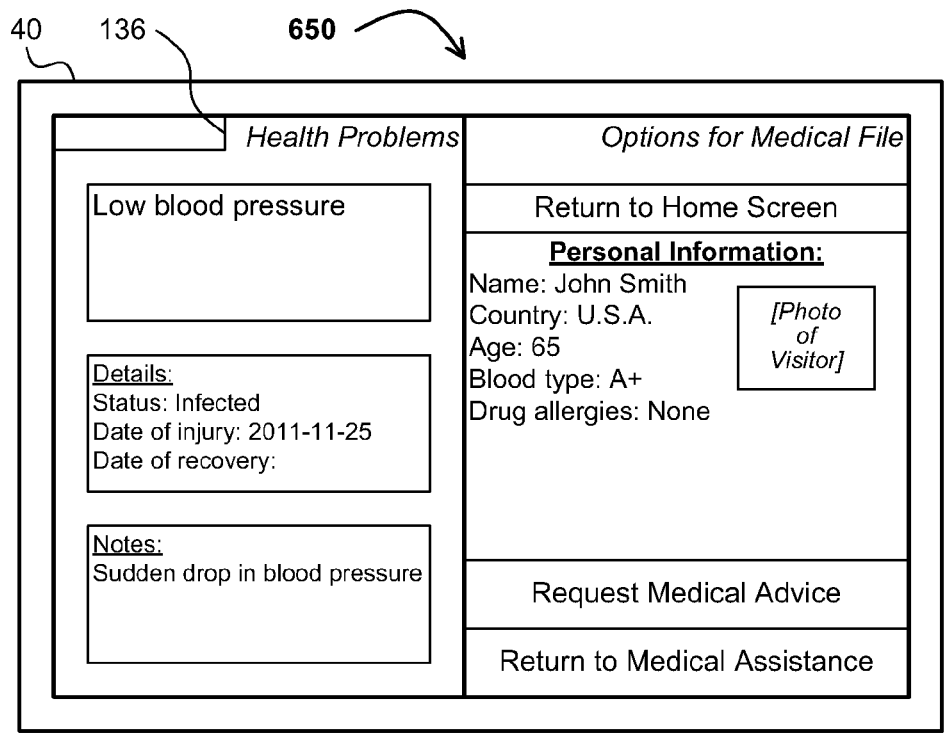

In addition, as shown in FIG. 4E, the crowd assistance application may provide a medical file button 134 for requesting display of medical information or records for the visitor. As indicated at blocks 850 and 852 of FIG. 3B, when the assistant selects that option, the crowd assistance application may present a medical file screen 650, as illustrated in FIG. 4F. That screen may include various different subdivisions with different kinds of medical data for the visitor. For instance, a tab 136 may correspond to a set of text boxes with information about known health problems of the visitor. A personal information box may show basic information such as age, blood type, and drug allergies. Other portions of the screen may provide a variety of other types of health data for the visitor.

As indicated in FIG. 3B, if the assistant has not requested medical assistance or the medical file for the visitor, the process may pass through page connector B back to the top of the process illustrated in FIG. 3A, with the crowd assistance application again performing one or more of the illustrated operations, as indicated above.

On one example scenario, an assistant may see that a visitor is unconscious and seriously injured. Consequently, the assistant may decide that an ambulance should be called. The assistant may then use the mobile computing device to scan the visitor's ID from an ID card worn by the visitor, and to request an ambulance, as described above. In response, the command center workstation may determine which available ambulance is closest to the visitor, and may send an immediate request to that ambulance to go to the patient. The command center workstation may also send the visitor's medical records, as indicated above. The nearest available ambulance then instantly responds to the request and moves towards the visitor's location.

In another embodiment, the mobile computing device may be used to call a service worker to a given location to conduct specific chores based on service needed in that location. For instance, service workers may be dispatched to perform a wide variety of services, including without limitation, repairs, cleaning, and restocking of supplies.

In another embodiment, the mobile computing device and/or the command center workstation may be used to retrieve and display video feeds from various neighborhood locations. Individuals may use the displayed feed to more or less subjectively assess crowdedness situations, and the command center workstation and/or the mobile computing device may use video analytics to generate an objective measurement of crowd numbers and density. These measurements may also be sent to third parties and use to generate and save historical and statistical data.

As described in detail above, the present disclosure pertains to methods and apparatus for providing automated assistance services for events that involve long distances and large crowds people. Such services may be useful for helping people in a wide variety of situations, including without limitation natural disasters, religious gatherings, sporting events, recreational activities, political gatherings, and commercial activities (e.g., shopping at a shopping mall). Accordingly, in one embodiment, a crowd may be considered large if it contains more than one hundred people. In another embodiment, a crowd may be considered large if it contains more than one thousand people. In another embodiment, a crowd may be considered large if it contains more than ten thousand people. In another embodiment, a crowd may be considered large if it contains more than one hundred thousand people. Similarly, in one embodiment, a distance may be considered long if it exceeds one hundred feet. In another embodiment, a distance may be considered long if it exceeds one thousand feet, in another embodiment, a distance may be considered long if it exceeds one mile. In another embodiment, a distance may be considered long if it exceeds ten miles.

In light of the principles and example embodiments described and illustrated herein, it will be recognized that the illustrated embodiments can be modified in arrangement and detail without departing from such principles. For example, various example screens have been discussed, and for any of those screens, when all of the screen features do not fit within the boundaries of the display, the mobile computing device may provide scroll bars and/or other screen control features for navigation to previously undisplayed screen portions. Similarly, although some screens are described as having user interface buttons, in alternative embodiments, any other suitable types of interface objects or features may be used instead of or in addition to buttons.

Also, this disclosure describes one or more embodiments of a crowd assistance application executing in a mobile computing device. However, in other embodiments, the crowd assistance application may be executed by other types of data processing systems, such as a data processing system installed in a kiosk. In addition, this disclosure describes various interactions between an assistant and the crowd assistance application. However, in other embodiments, such as a kiosk embodiment, some or all of the operations described above as being performed by the assistant may actually be performed by the visitor.

Also, the foregoing discussion has focused on particular embodiments, but other configurations are contemplated. Also, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Also, components that are described as being in communication with or coupled to each other, or as being responsive to each other, need not be in direct or continuous communication with each other, unless expressly specified otherwise. It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), flash memory, etc. In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions for another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines. In some embodiments, some or all of the control logic for implementing the described operations may be implemented in hardware logic (e.g., as part of an integrated circuit chip, a programmable gate array (PGA), an application specific integrated circuit (ASIC), etc.).

Similarly, although one or more example processes have been described with regard to particular operations perforated in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered. Likewise, although one or more example software architectures have been described with regard to particular operations performed by particular software components, numerous modifications could be applied to that architecture to derive numerous alternative architectures for the present invention, wherein one or more of the described operations are performed by different software components.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims and all equivalents to such implementations.

What is claimed is:

1. An automated system for providing assistance services for crowded events, the system comprising:
   a computing device with a control center interface to support network communications and a token reader to read a unique identifier for a visitor from an identification token for the visitor; and
   a command center workstation with (a) a network interface to support communications with the computing device and (b) a visitor database to store information for the visitor, wherein the information for the visitor comprises leader identification data to identify a leader associated with the visitor and leader location data to identify a last known location of the leader;
   wherein the computing device is configured to use the control center interface to send the unique identifier for the visitor from the computing device to the command center workstation, in response to reading the unique identifier for the visitor;
   wherein the command center workstation is configured to send the leader location data to the computing device, in response to receiving the unique identifier for the visitor from the computing device;
   wherein the computing device is operable to present a map that shows a current location of the visitor, the last known location of the leader, and directions from the current location of the visitor to the last known location of the leader;
   wherein the computing device is operable (a) to obtain medical records for the visitor from the command center workstation and (b) to display selectable medical options comprising (i) an option to request an ambulance and (ii) an option to communicate with a health care provider;
   wherein the computing device is configured to respond to selection of the option to request an ambulance by (a) sending a request for the ambulance to an ambulance dispatcher (b) sending the visitor location data to the ambulance dispatcher, and (c) sending the medical records for the visitor to the ambulance dispatcher; and
   wherein the computing device is configured to respond to selection of the option to communicate with a health care provider by (a) establishing a videoconference with the healthcare provider and (b) sending the medical records for the visitor to the health care provider.

2. A computing device comprising:
   a processor;
   a display responsive to the processor;
   a token reader responsive to the processor, the token reader configured to read a unique identifier for a visitor from an identification token for the visitor; and
   a storage medium containing instructions which, when executed by the processor, implement components comprising:
      a control center interface to support network communications with a command center workstation; and
      a visitor interface configured to display a map on the display;
   wherein the computing device is configured to use the control center interface to send the unique identifier for the visitor to the command center workstation, in response to reading the unique identifier for the visitor;

wherein the computing device is configured to use the control center interface to receive leader location data from the command center workstation, wherein the leader location data identifies a last known location of a leader associated with the visitor;

wherein the map shows a current location of the visitor, the last known location of the leader, and directions from the current location of the visitor to the last known location of the leader;

wherein the instructions enable the computing device (a) to obtain medical records for the visitor from the command center workstation and (b) to display selectable medical options comprising (i) an option to request an ambulance and (ii) an option to communicate with a health care provider;

wherein the instructions further enable the computing device to respond to selection of the option to request an ambulance by (a) sending a request for the ambulance to an ambulance dispatcher, (b) sending the visitor location data to the ambulance dispatcher, and (c) sending the medical records for the visitor to the ambulance dispatcher; and wherein the instructions further enable the computing device to respond to selection of the option to communicate with a health care provider by (a) establishing a videoconference with the healthcare provider and (b) sending the medical records for the visitor to the health care provider.

3. A computing device according to claim 2, further comprising:

a global positioning system (GPS) responsive to the processor, wherein the GPS is configured to automatically determine the current location of the visitor; and wherein the control center interface is configured to automatically send the current location of the visitor to the command center workstation.

4. An automated method for providing assistance services for crowded events, the method comprising:

using a computing device to read a unique identifier for a visitor from an identification token for the visitor;

in response to reading the unique identifier for the visitor:
automatically sending visitor location data for a current location of the visitor from the computing device to a remote command center; and
automatically receiving leader location data from the remote command center, wherein the leader location data identifies a last known location for a leader of a predetermined group of visitors that includes the visitor;

after receiving the leader location data, computing directions from the current location of the visitor to the last known location of the leader;

displaying a map on a display of the computing device, wherein the map shows the current location of the visitor, the last known location of the leader, and the directions from the current location of the visitor to the last known location of the leader;

presenting selectable medical options on the display, wherein the selectable medical options comprise (a) an option to request an ambulance and (b) an option to communicate with a health care provider;

obtaining medical records for the visitor;

in response to selection of the option to request an ambulance, (a) sending a request for an ambulance to an ambulance dispatcher, (b) sending the visitor location data to the ambulance dispatcher; and (c) sending the medical records for the visitor to the ambulance dispatcher; and in response to selection of the option to communicate with a health care provider, (a) establishing a videoconference with the healthcare provider, and (b) sending the medical records for the visitor to the health care provider.

5. An automated method according to claim 4, further comprising:

in response to reading the unique identifier for the visitor, automatically sending the unique identifier for the visitor from the computing device to the remote command center;

after sending the unique identifier for the visitor from the computing device to the remote command center, receiving, from the remote command center, residence location data to identify a location of a residence of the visitor;

after receiving the residence location data, computing directions from the current location of the visitor to the residence of the visitor; and displaying, on the map on the display of the computing device, the location of the residence of the visitor and the directions from the current location of the visitor to the residence of the visitor.

6. An automated method according to claim 4, further comprising:

obtaining crowd density data; and using the crowd density data to optimize route calculations when computing the directions from the current location of the visitor to the last known location of the leader.

7. An automated method according to claim 4, wherein the computing device comprises a first computing device, the method further comprising:

using a second computing device at a second location to read a unique identifier for the leader from an identification token for the leader; and in response to reading the unique identifier for the leader, automatically sending location data for the leader from second computing device to the remote command center.

8. An automated method according to claim 5, wherein:

the computing device automatically performs the operation of receiving residence location data from the remote command center, in response to reading the unique identifier for the visitor.

9. An automated method according to claim 4, further comprising:

automatically displaying personal information for the visitor in a graphical user interface on the display of the computing device, in response reading the unique identifier for the visitor from the identification token for the visitor;

after reading the unique identifier for the visitor from the identification token for the visitor, receiving, from the remote command center, residence location data to identify a location of a residence of the visitor;

computing directions from the current location of the visitor to the residence of the visitor, based at least in part on least in part on the residence location data;

automatically providing, in the graphical user interface, (a) at least one selectable location option for obtaining location assistance and (b) at least one selectable medical option for obtaining medical assistance;

receiving user input selecting the location option from the graphical user interface;

in response to receiving the user input selecting the location option, automatically providing, in the graphical user interface, (a) a selectable residence option for requesting directions to the residence of the visitor and (b) a selectable leader option for requesting directions to the last known location of the leader; and in response to receiving user input selecting the residence option, automatically displaying, on the map on the display, the location of the residence of the visitor and the directions from the current location of the visitor to the residence of the visitor; and wherein the operation of displaying the directions from the current location of the visitor to the last known location of the leader is performed automatically in response to user input selecting the leader option.

10. At least one non-transitory machine accessible medium comprising:
instructions that, when executed by a computing device, enable the computing device to perform the method recited in claim 4.

11. At least one non-transitory machine accessible medium comprising:
instructions that, when executed by a computing device, enable the computing device to perform the method recited in claim 5.

12. An automated system according to claim 1, wherein the computing device is further configured to:
compute and display an estimated time of arrival (ETA) for the ambulance;
receive location updates for the ambulance;
update the map to show progress of the ambulance, based at least in part on the received location updates for the ambulance;
compute updated ETAs for the ambulance, based at least in part on the received location updates for the ambulance; and
display the updated ETAs.

13. An automated system according to claim 12, further comprising:
at least one camera operable to provide a video feed; and
wherein the computing device is further configured to:
receive the video feed;
compute crowd density data, based on the video feed; and
use the crowd density data when computing at least one ETA for the ambulance.

14. An automated system according to claim 1, further comprising:
at least one camera operable to provide a video feed; and
wherein the computing device is further configured to:
receive the video feed;
compute crowd density data, based on the video feed; and
use the crowd density data to optimize route calculations when computing the directions from the current location of the visitor to the last known location of the leader.

15. A computing device according to claim 2, wherein the computing device is further configured to:
compute and display an estimated time of arrival (ETA) for the ambulance;
receive location updates for the ambulance;
update the map to show progress of the ambulance, based at least in part on the received location updates for the ambulance;
compute updated ETAs for the ambulance, based at least in part on the received location updates for the ambulance; and
display the updated ETAs.

16. A computing device according to claim 15, wherein the computing device is further configured to:
receive at least one video feed;
compute crowd density data, based on the video feed; and
use the crowd density data when computing at least one ETA for the ambulance.

17. A computing device according to claim 2, wherein the computing device is further configured to:
receive at least one video feed;
compute crowd density data, based on the video feed; and
use the crowd density data to optimize route calculations when computing the directions from the current location of the visitor to the last known location of the leader.

18. A method according to claim 4, further comprising:
computing and displaying an estimated time of arrival (ETA) for the ambulance;
receiving location updates for the ambulance;
updating the map to show progress of the ambulance, based at least in part on the received location updates for the ambulance;
computing updated ETAs for the ambulance, based at least in part on the received location updates for the ambulance; and
displaying the updated ETAs.

19. A method according to claim 18, further comprising:
receiving at least one video feed;
computing crowd density data, based on the video feed; and
using the crowd density data when computing at least one ETA for the ambulance.

20. A method according to claim 4, further comprising:
receiving at least one video feed;
computing crowd density data, based on the video feed; and
using the crowd density data to optimize route calculations when computing the directions from the current location of the visitor to the last known location of the leader.

* * * * *